United States Patent [19]
Lee

[11] Patent Number: 5,675,697
[45] Date of Patent: Oct. 7, 1997

[54] SIGNAL RESTORING APPARATUS IN DVCR USING TWO THRESHOLD VALUES

[75] Inventor: Dong Wha Lee, Seoul, Rep. of Korea

[73] Assignee: LG Electronics Inc., Seoul, Rep. of Korea

[21] Appl. No.: 533,701

[22] Filed: Sep. 26, 1995

[30] Foreign Application Priority Data

Sep. 28, 1994 [KR] Rep. of Korea ............... 24517/1994

[51] Int. Cl.[6] ............................ H04N 5/76; H04N 5/92
[52] U.S. Cl. .................................. 386/124; 386/40
[58] Field of Search ................................ 358/335, 342, 358/310; 360/32, 39, 48, 54; 369/124, 54, 58; 386/40, 124; H04N 5/76, 5/92

[56] References Cited

U.S. PATENT DOCUMENTS

| | | | |
|---|---|---|---|
| 5,396,377 | 3/1995 | Yang | 360/32 |
| 5,416,804 | 5/1995 | Khaled et al. | 348/466 |
| 5,416,806 | 5/1995 | Coker et al. | 360/32 |
| 5,502,569 | 3/1996 | Kanota | 358/335 |
| 5,552,940 | 9/1996 | Umemoto et al. | 360/32 |

*Primary Examiner*—Thai Tran
*Attorney, Agent, or Firm*—John P. White

[57] ABSTRACT

A signal restoring apparatus in a DVCR, which generates a bit erasure signal by using two threshold value and uses the same in detection of synchronism so that error detection/correction rate in demodulating signals can be improved. The apparatus detects three of "0," "1" and the bit erasure signal by using two threshold having a value different from each other in the signal detection so that matching rate becomes high by using the detected bit erasure signal. When the bit erasure signal occurs over predetermined number, the matching is not performed and the output of the incorrect synchronism signal is restrained by generating the erasure signal, thereby enhancing error correction capability.

5 Claims, 7 Drawing Sheets

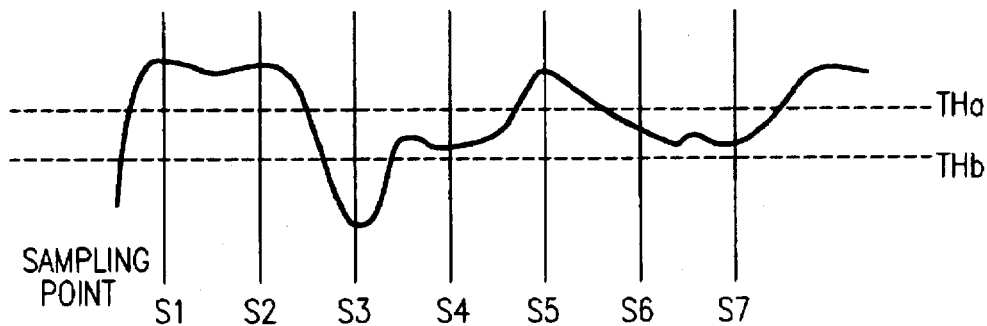

SIGNAL RESTORING APPARATUS IN DVCR USING TWO THRESHOLD VALUES

BACKGROUND OF THE INVENTION

The present invention relates to a signal restoring apparatus in a DVCR (digital video cassette recorder), and more particularly, to a signal restoring apparatus in a DVCR, which generates a bit erasure (hereunder, called as a "BE") signal by using two threshold value and uses the same in detection of synchronism so that error detection/correction rate in demodulating signals can be improved.

FIG. 1 is a view illustrating a conventional and general signal reproducing system of the DVCR.

As shown in the drawing, the signal reproducing system comprises a signal detector 1, a sync detector 2, a demodulator 3, an inner decoder 4, a deinterleaving unit 5 and an outer decoder 6.

In the operation of the above system of such a structure, a signal read out from a head (not shown) is input to signal detector 1 via an equalizer (not shown) and an amplifier (not shown). The input signal is determined as "0" or "1" in signal detector 1 and output as a binary bit stream. The binary bit stream is input to synchronism detector 2 and a predetermined pattern, i.e., a sync pattern is detected among the binary bit stream during recording. When the sync pattern is detected in synchronism detector 2, a start and ending of an m-bit signal constituting a single symbol. Thus, signals can be processed in the following process by a unit of a symbol being divided into the m-bit.

In demodulator 3, the signal of the m-bit input from synchronism detector 2 is mapped into one byte, i.e., an 8-bit symbol. For instance, in case of 8–14 modulation and 8–10 modulation, m equals 14 and 10, respectively. The signal demodulated in demodulator 3 is input to inner decoder 4 for performing error detection and correction. The output of inner decoder 4 is input to deinterleaving unit 5 to be deinterleaved and input to outer decoder 6 for correcting error and erasure.

FIG. 2A is a view illustrating a detailed configuration of signal detector 1 of FIG. 1, and signal detector 1 comprises a comparator 1a as shown in FIG. 2a. Comparator 1a is for comparing an input signal with a given threshold value (TH) and outputting a binary bit stream as shown in FIG. 2B by detecting "1" when an input signal level is large and "0" when small.

FIG. 3 is a view illustrating a detailed configuration of synchronism detector 2 of FIG. 1. As shown in the drawing, synchronism detector 2 comprises a shift register 2a, a pattern matching unit 2b, a window signal generator 2c, an OR gate OR1, an AND gate (AND1) and a counter 2d.

In the operation of synchronism detector 2 having such a structure, the binary bit stream output from signal detector 1, i.e., a serial data (Ds), is input to pattern matching unit 2b after being shifted through shift register 2a, so that a pattern is matched and a low signal is output from pattern matching unit 2b. That is, pattern matching unit 2b having a synchronism pattern compares the synchronism pattern with an input signal from shift register 2a, and when the comparison result is the same, i.e., matched, the low, signal is output.

Also, window signal generator 2c is for generating a window signal which indicates a position of the synchronism pattern corresponding to an input of HSP' signal, a duty ratio modulation signal of a head switching pulse (HSP). The outputs of window signal generator 2c and pattern matching unit 2b are OR-ed at OR gate (OR1) and an output of OR gate (OR1) becomes "low" when both the outputs of pattern matching unit 2b and window signal generator 2c are "low." Accordingly, a matched signal at an undesired position is not accepted.

Counter 2d counts as much as interval between the synchronism patterns. When a matched pattern is not present, the counter outputs synchronism signals after uniform interval from the synchronism pattern which was matched previously. The outputs of OR gate (OR1) and counter 2d are AND-ed at AND gate (AND1) so as to be output as a finally detected synchronism signal.

FIG. 4 is a view illustrating a detailed configuration of demodulator 3 of FIG. 1, comprising a mapping unit 3a as shown in FIG. 4. Mapping portion 3a receives the m-bit symbol output from synchronism detector 2 and finds and outputs a corresponding 8-bit symbol.

FIG. 5A is a sampling view when detection errors are generated in a general signal detection. FIG. 5B is a sampling view of a normal signal in the general signal detection.

The input signal for the signal detection shows not the maximum peak in a sampling time as shown in FIG. 5B, but a distorted signal peak on a time axis as P1 of FIG. 5A. Further, there are many occurrences of detection errors due to inter-symbol interference (ISI) or incomplete equalization. When such a signal is input to the synchronism detector as the serial data, a single incorrect bit among the m-bit prevents the pattern matching so that probability of matching becomes low. Thus, like a case when mismatching occurs, a synchronism signal generated from the counter of the synchronism detector which outputs synchronism signals after uniform interval from the previously matched synchronism signal, when a matched pattern does not exist in the pattern matching unit, becomes also incorrect so that exact signal demodulation renders difficult. Further, when a single bit becomes incorrect during the mapping in demodulator 3, an error occurs or an m-bit which will not become a suitable symbol is produced.

SUMMARY OF THE INVENTION

To solve the above problems, it is an object of the present invention to provide a signal restoring apparatus of a DVCR which is capable of not using an error bit in pattern matching in synchronism detection so as to improve matching rate and generating a symbol erasure signal when the error bit is regarded as being beyond a particular number so that mis-detection rate is lowered and efficient decoding becomes possible.

Accordingly, to achieve the above object, there is provided an apparatus of restoring a signal of a digital video cassette recorder (DVCR) comprising: a signal detecting unit for generating "1," "0" and a BE signal by using an input data and two threshold value THa and THb having a different value each other; a synchronism detecting unit for detecting a synchronism signal according to the number of bit erasure signals by searching the number of the bit erasure signal among values output from the signal detector and converting a serial data to parallel data; a demodulating unit for generating the erasure signal when the number of the bit erasure signal is over the particular number by mapping parallel output data output from the synchronism detector and simultaneously searching the number of the bit erasure signal; and a decoding unit for error detecting and correcting by using the erasure signal output from the demodulator.

BRIEF DESCRIPTION OF THE DRAWINGS

The above objects and advantages of the present invention will become more apparent by describing in detail a preferred embodiment thereof with reference to the attached drawings in which:

FIG. 9 is a view illustrating an example of an input signal of FIG. 7;

FIGS. 10A–10I show signal waveforms of each portion of a synchronism detector of FIG. 8;

DETAILED DESCRIPTION OF THE INVENTION

Figure 6:
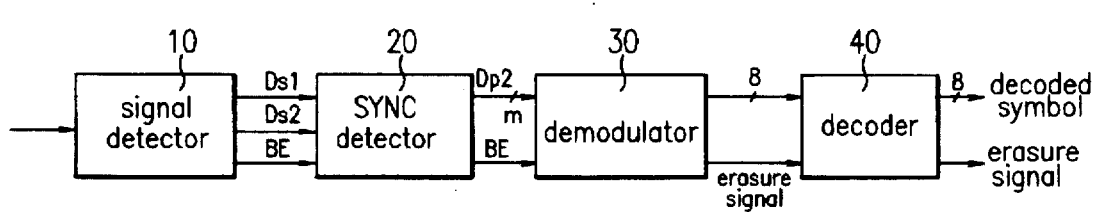
FIG. 6 is a view showing a structure of a signal restoring apparatus of a DVCR according to the present invention.

As shown in FIG. 6, a signal restoring apparatus of a DVCR according to the present invention comprises a signal detector 10, a synchronism detector 20, a demodulator 30 and a decoder 40.

Figure 7:
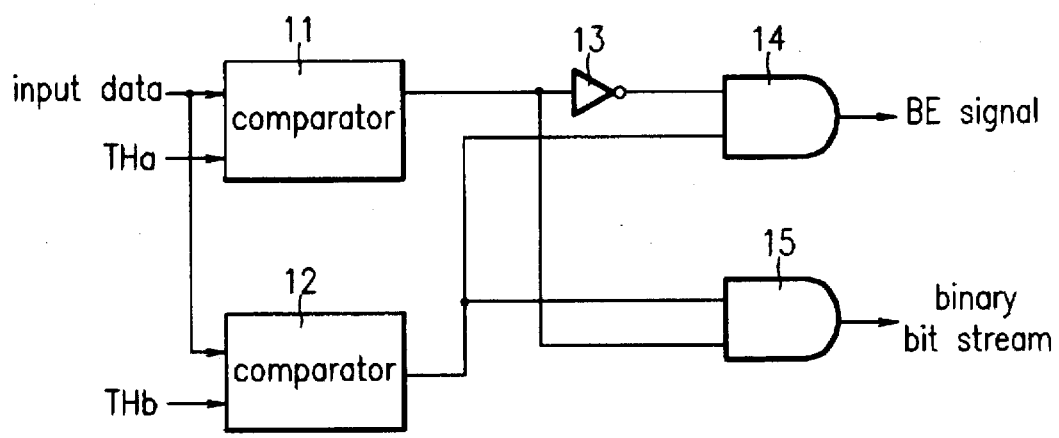
FIG. 7 is a view showing a detailed structure of a signal detector of FIG. 6.

Signal detector 10 is for generating "1," "0" and a BE signal by using an input data and two threshold value THa and THb having a different value each other. As shown in FIG. 7, the signal detector comprises comparators 11 and 12 for comparing the input data and the two threshold values THa and THb, respectively, an AND gate 15 for outputting a binary bit stream by AND-operating an output of comparators 11 and 12, an inverter 13 for inverting the output of comparator 11, and an AND gate 14 for outputting the BE signal by AND-operating outputs of inverter 13 and comparator 12.

Figure 8:
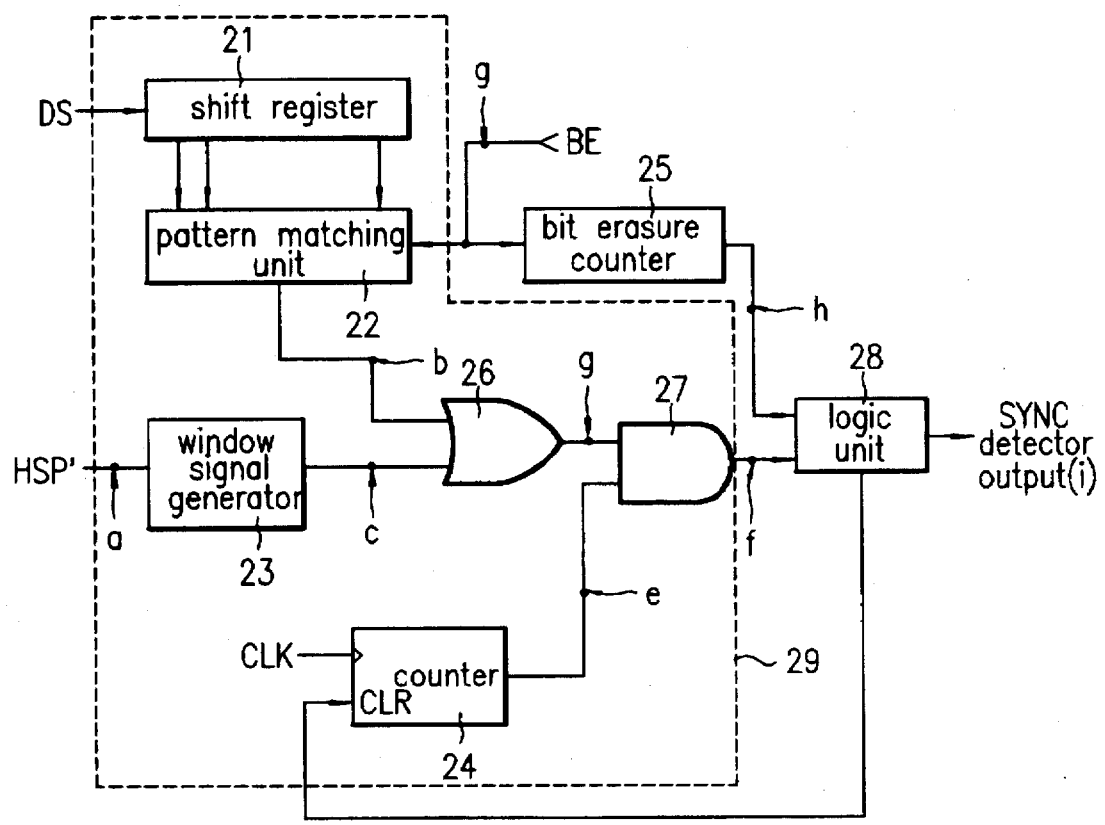
FIG. 8 is a view showing a detailed structure of a synchronism detector of FIG. 6.

Synchronism detector 20 is for detecting a synchronism signal according to the number of the BE signal by searching the number of the BE signal among values output from signal detector 10 and converting a serial data to parallel data. As shown in FIG. 8, the synchronism detector comprises a bit erasure counter 25 for counting the BE signal output from signal detector 10 and outputting a "high" signal when the number of BE signal becomes over a particular number, a synchronism pattern detector 29 for detecting a synchronism pattern by using the serial data output from signal detector 10 and the BE signal, and a logic unit 28 for outputting a "high" signal when a signal output from BE counter 25 is a "high" signal and a signal output from synchronism pattern detector 29 when "low."

Here, synchronism pattern detector 29 comprises a shift register 21 for shifting the serial data output from signal detector 10, a pattern matching unit 22 for comparing an output of shift register 21 with a stored synchronism pattern according to the BE output from signal detector 10 and outputting a "low" signal when both are congruous, a window signal generator 23 for generating a window signal which indicates a position of the synchronism by using a head switching pulse (HSP) of which duty ratio is altered, an OR gate 26 for OR-operating outputs of pattern matching unit 22 and window signal generator 23, a counter 24 for being cleared according to the control of a logic unit 28 and outputting the synchronism signal by using a clock when no matched pattern is present according to the matching result of the pattern matching unit, and an AND gate 27 for outputting to logic unit 28 the result of AND-operation of outputs of OR gate 26 and counter 24.

Demodulator 30 is for generating the erasure signal when the number of the BE is over the particular number by mapping parallel output data output from synchronism detector 20 and simultaneously searching the number of the BE. Here, the erasure signal is generated by a unit of a symbol.

Decoder 40 is for error-detecting/correcting by using the erasure signal output from demodulator 30.

The operation of the signal demodulating apparatus in a DVCR according to the present invention will be described now referring to the accompanying drawings.

Signal detector 10 is for comparing the threshold value being arranged as a Maximum value (THa) and a minimum value (THb) with input data at comparators 11 and 12, respectively, and outputting the binary bit stream and BE signal according to the comparison result. That is, comparator 11 compares the maximum value of the threshold value with the input data and outputs as the comparison result "1" when the input data value is greater than the THa and "0" when less. Comparator 12 compares the minimum value of the threshold value with the input data and outputs as the comparison result "1" when the input data value is greater than the THb and "0" when less.

The outputs of comparators 11 and 12 are OR-operated at AND gate 15 and output as the binary stream of "0" and "1." Also, the output of comparator 11 is inverted through inverter 13 and OR-operated with the output of comparator 12 at AND gate 14 to be output as the BE signal.

In FIG. 9, an example of an input signal of signal detector 10 is shown, in which sampling points s1, s2, s5 and s6 are points detected as "1," sampling point s3 is a point detected as "0," and sampling points s4 and s7 are points for outputting the BE signal by determining incredible portions.

The operation of signal detector 10 will be described again with an example of sampling point s1.

Since an input data value of sampling point s1 is greater than threshold value THa and THb, the outputs of comparators 11 and 12 become "high," and accordingly, an output of AND gate 15 becomes "high" so that sampling point s1 is detected as "1."

In the meantime, the BE signal generated from signal detector 10 is input to BE counter 25 of synchronism detector 20 and pattern matching unit 22 of synchronism pattern detector 29 to be used in synchronism detection. That is, when the bit number constituting the synchronism is "m," a particular number "k" is set in relationship of k≦m. When the number of the BE is greater than the "k" among m-bit stored in shift register 21 by counting the number of the BE by BE counter 25, the pattern matching is determined as meaningless so that a signal indicative of no detected synchronism signal regardless of the matching of an m-k bit is transmitted to logic unit 28. In such a case, BE counter 25 transmits a "high" signal to logic unit 28 and logic unit 28 outputs the "high" signal when the "high" signal is input from BE counter 25.

When the number of BE signal is counted at BE counter 25 and the number of the BE signal is determined to be less than the particular value "k," i.e., the pattern matching has meaning, pattern matching unit 22 tries the pattern matching with bits exclusive of the bits corresponding to the BE signal. In this case, a "low" signal is input to logic unit 28 from BE counter 25 and logic unit 28 receiving the "low" signal outputs the output of AND gate 27 as a synchronism detection output. That is, except when the number of the BE signal is generated too much in the m-bit, the pattern matching is tried only with the bits exclusive of the incredible BE signal portion.

On the other hand, FIG. 10 shows a signal wave form of each part of synchronism detector 20 of FIG. 8. A reference numeral (a) denotes a signal HPS' in which the duty ratio of the head switching pulse is altered; a reference numeral (b) denotes a wave form resulted from the pattern matching; a reference numeral (c) denotes a window signal which is the output of window signal generator 23; a reference numeral (d) denotes the output of OR gate 26, i.e., the result of OR-operation of (b) and (c); a reference numeral (e) denotes the output of counter 24; a reference numeral (f) denotes the output of AND gate 27, i.e., the result of AND-operation of (d) and (e); and a reference numeral (h) denotes the output of BE counter 25 which becomes "high" when the number of the BE signal in the m-bit is greater than "k" and "low" when not.

The dotted section in the (b) of FIG. 10 is for showing a portion where no synchronism signal is detected. However, when the detected signal is correct, the synchronism signal can be found by counter 24 as (e). The second detected signal in (f) is not accepted as a synchronism since a "high" signal is output due to a plenty of the BE signals. Accordingly, the synchronism detection output from logic unit 28 is shown like (i).

Figure 11:
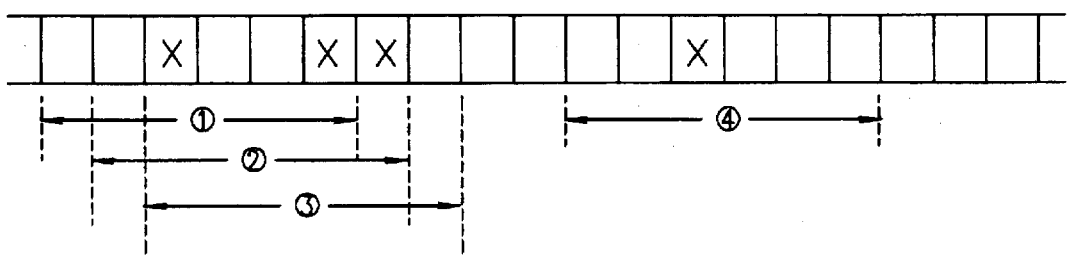
FIG. 11 shows an example of an input signal of the synchronism detector of FIG. 8.

FIG. 11 shows an example of the input signal of the synchronism detector of FIG. 8. Assuming that m=6 and k=2, when the content of shift register 21 is, two BE signals marked as x among 6-bit remain and the pattern matching is tried with the remaining four bits. When the content of shift register 21 is , the number of the BE signal is one being less than "k" so that the pattern matching is tried like the case of. However, when the content of shift register 21 is and, the number of the BE signal is three being greater than "k" so that a signal is output, indicative of no synchronism pattern is detected regardless of the pattern matching.

Figure 1:
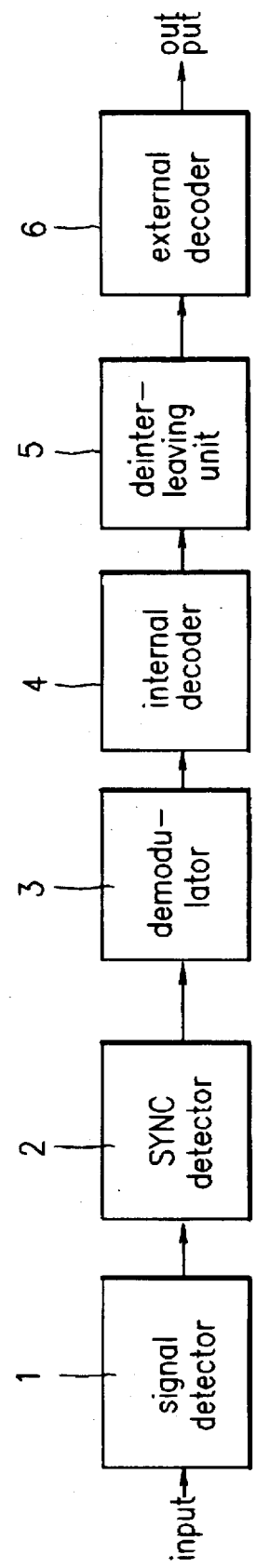
FIG. 1 is a block diagram illustrating a general signal reproducing system of a DVCR.
Figure 2A:
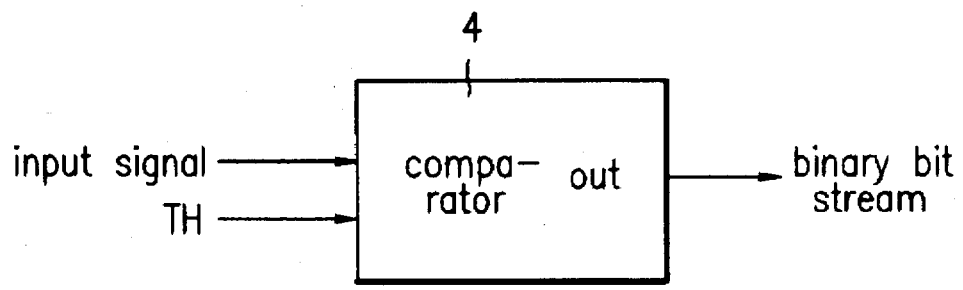
FIG. 2A is a view showing a detailed structure of a signal detector of FIG. 1.
Figure 2B:
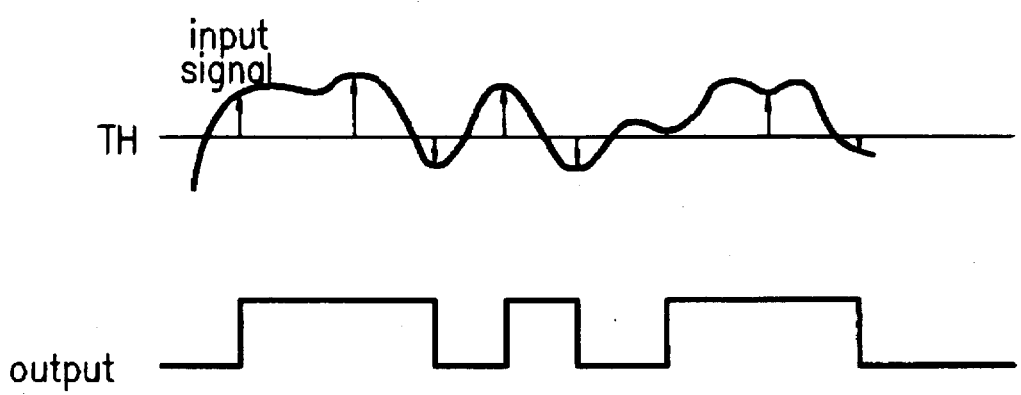
FIG. 2B shows a wave form of input/output signals of the signal detector.
Figure 3:
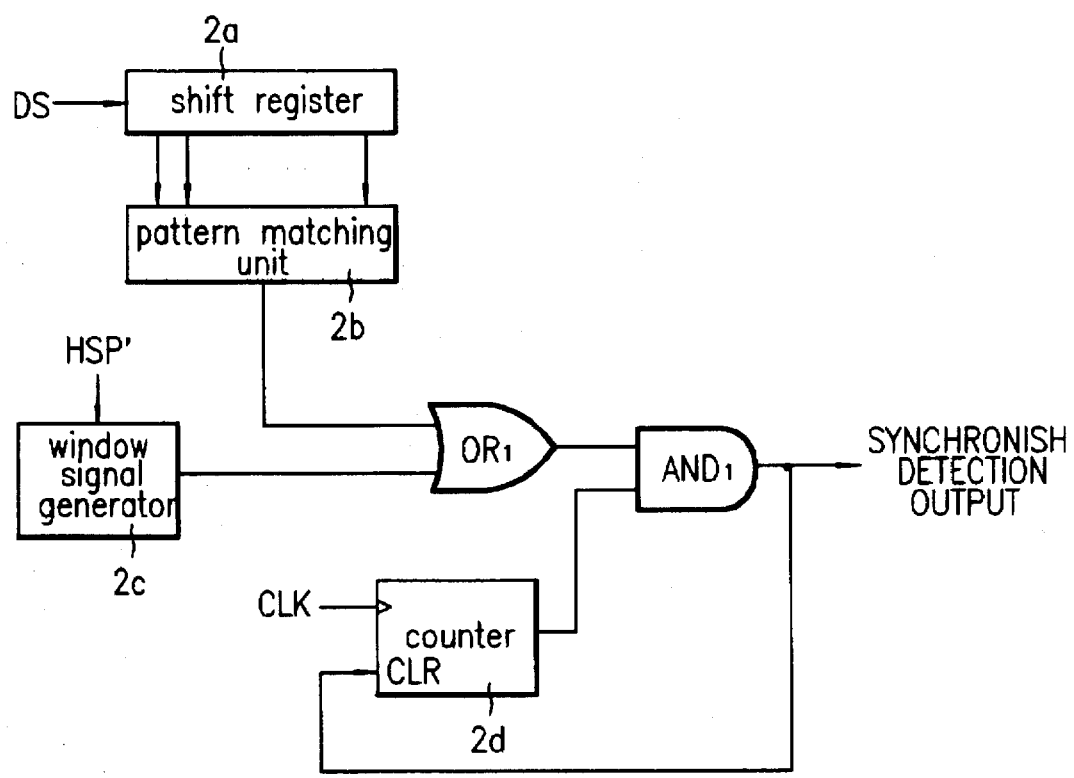
FIG. 3 is a view showing a detailed structure of a synchronism detector of FIG. 1.
Figure 4:
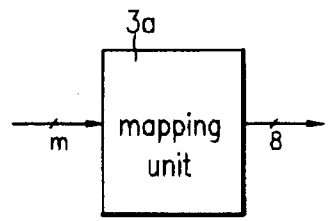
FIG. 4 is a view illustrating a structure of a demodulator of FIG. 1.
Figure 5A:
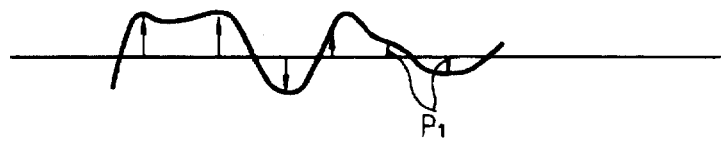
FIG. 5A is a sampling view of a general signal detection in which detection error is generated.
Figure 5B:
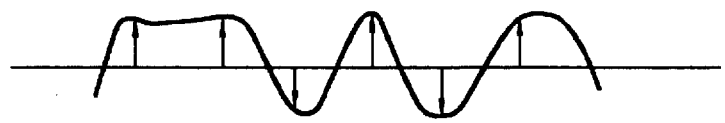
FIG. 5B is a sampling view of a general signal detection in which a normal signal is generated.

Meanwhile, referring to FIG. 6, the signal detected at signal detector 10 in the same method as in FIG. 2 of conventional technology is Ds1, and a signal detected in the same method as in FIG. 7 is Ds2. Synchronism detector 20 detects the synchronism signal by using the BE signal and the Ds1 signal and performs serial-parallel conversion, i.e., acting as a divider of continuous serial data by a unit of a symbol.

When it is known that the synchronism detection and which bits are the m-bit forming a symbol, demodulator 30 receives the Ds2 being made by dividing the Ds2 by the m-bit and the BE signal. Thus, demodulator 30 determines whether the signal to be demodulated is a credible signal or not by using the BE signal. That is, the input m-bit is being mapped as a symbol of 8-bit and when the number of the relevant BE signal is over the predetermined number $\beta$, the erasure signal is generated by a unit of a symbol.

Figure 12:
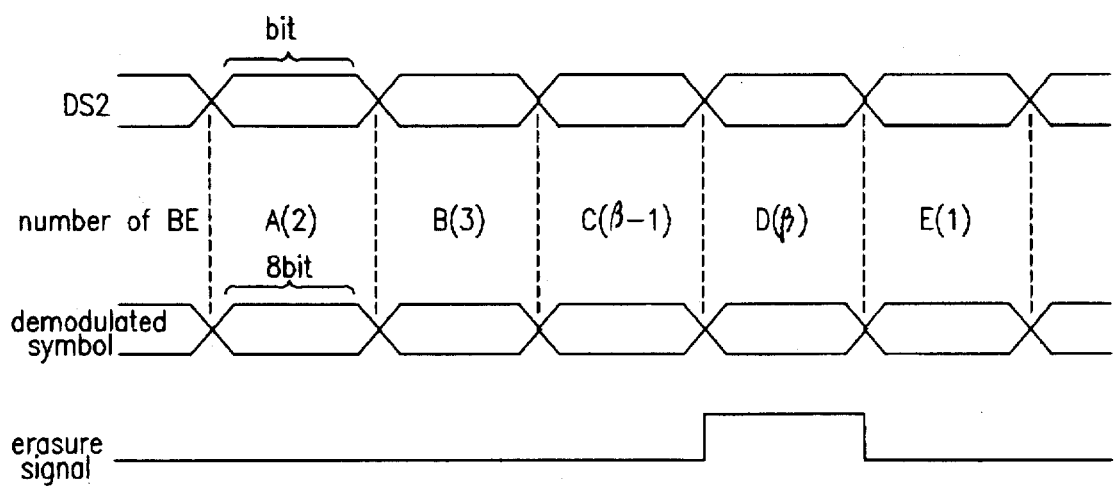
FIG. 12 shows a timing view of the input/output signal of a demodulator of FIG. 6.

The above process is shown in FIG. 12. Here, the number of the BE signal of sections A, B, C and D are 2, 3, $\beta-1$ and 1, respectively, which is less than the predetermined number $\beta$, the erasure signal by a unit of a symbol does not generated. Since section D is congruous with the predetermined number $\beta$, the erasure signal is generated by a unit of a symbol in section D.

In decoder 40, error detection and correction are performed of which capability is determined by following equation.

$$2t+e \leq dmin-1 \qquad \text{equation (1)}$$

Here, "t" is the number of error occurred; "e" is the number of the erasure signal; and "dmin" is minimum distance of a code.

For example, in case of a Reed-Solomon code, since the number of parity equals "dmin-1", parity of at least "2 t+e" is required to correct t-numbered errors and e-numbered erasure signals. In other words, if t-numbered errors can be corrected with the same parity, the erasure signal is capable of correcting as many as 2 t. In demodulator 30, thus, error correction capability can be improved by transmitting the erasure signal to the symbol when a symbol is incredible, rather than transmitting the symbol without correcting the error.

As described above, the present invention detects three of "0," "1" and the BE signal by using two threshold having a value different from each other in the signal detection so that matching rate becomes high by using the detected BE signal. When the BE signal occurs over predetermined number, the matching is not performed and the output of the incorrect synchronism signal is restrained by generating the erasure signal, thereby enhancing error correction capability.

What is claimed is:

1. An apparatus of restoring a signal of a digital video cassette recorder (DVCR) comprising:

a signal detecting unit for generating "1,""0" and bit erasure signals by using an input data and two threshold values THa and THb having a different value from each other;

a synchronism detecting unit for detecting a synchronism signal according to the number of bit erasure signals by searching the number of the bit erasure signal among values output from said signal detecting unit and converting a serial data to parallel data;

a demodulating unit for generating the erasure signal when the number of the bit erasure signal is over the particular number by mapping parallel output data output from said synchronism detecting unit and simultaneously searching the number of the bit erasure signal; and a decoding unit for error detecting and correcting by using the erasure signal output from said demodulating unit.

2. An apparatus of restoring a signal of a digital video cassette recorder (DVCR) according to claim 1, said signal detecting unit comprising:

first and second comparators for comparing the input data and the two threshold values, respectively;

a first AND gate for outputting a binary bit stream by AND-operating an output of said first and second comparators;

an inverter for inverting the output of said first comparator;

a second AND gate for outputting the bit erasure signal by AND-operating outputs of said inverter and second comparator.

3. An apparatus of restoring a signal of a digital video cassette recorder (DVCR) according to claim 1, said synchronism detecting unit comprising:

a bit erasure counter for counting the bit erasure signal output from said signal detector and outputting a "high" signal when the number of bit erasure signal becomes over a particular number;

a synchronism pattern detector for detecting a synchronism pattern by using the serial data output from said signal detector and the bit erasure signal; and a logic unit for outputting a "high" signal when a signal output from said bit erasure counter is a "high" signal and a signal output from said synchronism pattern detector when "low."

4. An apparatus of restoring a signal of a digital video cassette recorder (DVCR) according to claim 3, said synchronism pattern detecting unit comprising:

a shift register for shifting the serial data output from said signal detector;

a pattern matching unit for comparing an output of said shift register with a stored synchronism pattern according to the bit erasure output from aid signal detector and outputting a "low" signal when both are congruous;

a window signal generator for generating a window signal which indicates a position of the synchronism by using a head switching pulse of which duty ratio is altered;

an OR gate for OR-operating outputs of said pattern matching unit and window signal generator;

a counter for being cleared according to the control of said logic unit and outputting the synchronism signal by using a clock when no matched pattern is present according to the matching result of said pattern matching unit; and an AND gate for outputting to said logic unit the result of AND-operation of outputs of said OR gate and counter.

5. An apparatus of restoring a signal of a digital video cassette recorder (DVCR) according to claim 1, said erasure signal is generated by a unit of a symbol.

* * * * *